Dec. 2, 1958     E. C. LOWE     2,862,795
PROCESS OF SYNTHESIZING SILICON CARBIDE
Filed Dec. 4, 1953
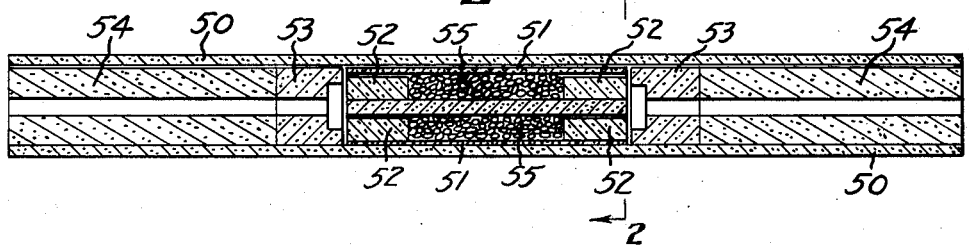
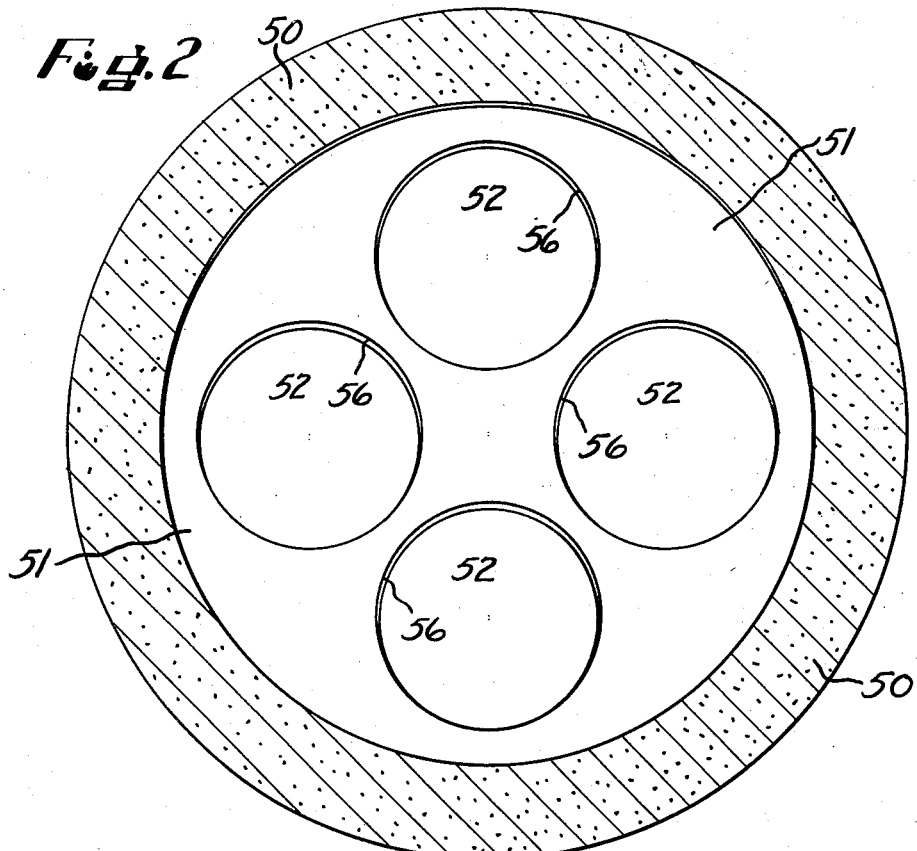
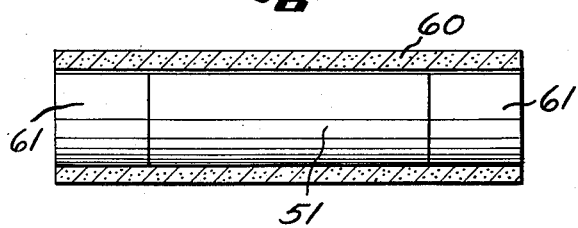
INVENTOR.
EDWIN C. LOWE
BY
ATTORNEY

2,862,795
PROCESS OF SYNTHESIZING SILICON CARBIDE

Edwin C. Lowe, Niagara Falls, Ontario, Canada, assignor to Norton Company, Worcester, Mass., a corporation of Massachusetts Application December 4, 1953, Serial No. 396,255

8 Claims. (Cl. 23—208)

The invention relates to synthesizing silicon carbide.

One object of the invention is to produce silicon carbide at low temperatures. Another object of the invention is to produce metallurgical grade silicon carbide at low cost. Another object of the invention is to produce silicon carbide in readily available small furnaces. Other objects are to produce various grades of silicon carbide without evolving uncontrolled gases in large quantities, without volcanic effects and without filling the air with particles of silicon carbide whenever there is a strong wind. Another object of the invention is to eliminate the hazards presently involved in the manufacture of silicon carbide. Another object is to provide a clean process. Another object is to synthesize silicon carbide in such a manner that the carbon monoxide evolved can be collected and used for the potential thermal energy therein. Another object is to provide a process permitting the production of solid carbon dioxide as a by-product.

Other objects will be in part obvious or in part pointed out hereinafter.

In the accompanying drawings, illustrating one of many possible apparatus which can be used to carry out the process of the invention, Figure 1 is an axial sectional view through a tube furnace which is loaded for carrying out the process.

Figure 2 is a cross section on an enlarged scale taken along the line 2—2 of Figure 1.

Figure 3 is an axial sectional view on the same scale as Figure 1 of a sleeve used to receive the container when it is ejected from the furnace tube, showing the container and plugs therein.

I will first give an illustrative example of my process.

EXAMPLE 1

I provided the following mixture.

Table I

| | Parts by weight |
|---|---|
| Silica sand through 160 mesh | 60. |
| Petroleum coke through 160 mesh | 36 fixed carbon. |
| Sodium silicate solution, $10Na_2O 30SiO_2 60H_2O$ | 18. |
| Iron phosphate, $FePO_4 \cdot 2H_2O$ | 2. |

The material of Table I was thoroughly mixed in a pan mill and was then passed through a pelletizing machine with dies to make pellets which were egg-shaped and about 1.5″ long.

Referring now to Figures 1 and 2, the graphite tube 50 of the tube furnace of U. S. Patent No. 2,125,588 to Ridgway is illustrated. I used such a furnace to synthesize silicon carbide in accordance with this example. The furnace was constructed substantially as shown and described in this Ridgway patent. The stationary but adjustable elements of the pressure apparatus were withdrawn, as is easily done, and the air ram was used to do the pushing hereinafter described.

Referring now to Figure 1, I show the graphite tube 50 loaded as it was during the heating of the mixture. In this tube 50 is a graphite container 51 having four parallel bores in the ends of which are graphite plugs 52. Short graphite blocks 53 having central axial bores and counterbored abut the container 51 at either end thereof.

Outside of and abutting the short blocks 53 are long graphite blocks 54 having central axial bores. These blocks 54 extend substantially to the ends of the tube 50 as illustrated. The charge of pellets 55 made from the material of Table I filled the four bores in the container 51 between the plugs 52. See Figure 2 for the arrangement of the bores 56 in the container 51.

The loading of the tube 50, as above described, was done while the tube 50 was cold. I then applied the power to send electric current through the tube 50, and heated it to 1550° C., which temperature was maintained for four hours with the charge 55 in position as shown in Figure 1. It was then time for reloading. Without turning off the power I then reloaded the tube 50 as follows.

Using the air ram of the furnace of the Ridgway patent I placed an additional block 53 against the right hand block 54 and pushed until the additional block 53 had entered the tube 51. The counterbore of the additional block 53 was on the right hand end thereof. In the meantime I had loaded an additional container 51 with a charge of pellets 55 and plugs 52. Proceeding in similar fashion by using the air ram of the furnace I injected the newly loaded container containing unreacted charge 55 and pushed it fully into the tube 51. This action ejected the left hand long block 54 and also the left hand short block 53 which were picked up with tongs for further use. Again working from the right hand end, in similar fashion, I injected and pushed a short block 53 with counterbore to the left and, following that, a spare long block 54. Pushing the last-mentioned long block 54 all the way into the tube 50 ejected the container 51 with the reacted charge, which was picked up in a long graphite sleeve 60, Figure 3, because it was very hot and to inhibit oxidation. Unbored blocks 61 were quickly inserted into the ends of sleeve 60 to keep out the air as much as possible and then the assembly of sleeve 60, blocks 61 and container 51 was allowed to cool. This completed the reloading of the furnace.

As a result of the run just described there was produced silicon carbide of cubic crystallinity having a siliconcarbide content of 83.58%, with 2.83% free carbon, the balance being chiefly silica with some ash. The product was in the form of pellets substantially the same size and shape as the original pellets. This is quite an acceptable grade of silicon carbide for metallurgical purposes. There is presently a large demand for such silicon carbide. The crystal size was small and the ultimate particles were small which made it an excellent product for any chemical purposes.

The purpose of the bores and counterbores and the somewhat loose fit of the plugs 52 as shown is to allow free egress of the carbon monoxide generated. If this gas were not allowed readily to escape it would flow into the sighting tube of the optical pyrometer and make temperature readings difficult as it would burn in this tube. It will further be seen that, carrying out the process in a tube results in delivering the CO at only two spots where it can readily be collected by hoods and taken off by pipes to be burned at any convenient location where the heat of combustion can be used. Furthermore the carbon dioxide thus generated can be collected with scrubbers, compressed and cooled to form solid carbon dioxide which is a saleable by-product.

EXAMPLE II

I provided a mixture as follows.

Table II

| | Parts by weight |
|---|---|
| Silica sand through 160 mesh | 56.5. |
| Petroleum coke through 160 mesh | 34 fixed carbon. |
| $FePO_4$ | 1. |
| Sodium silicate solution $10Na_2O30SiO_260H_2O$ | 18. |

The material of Table 2 was thoroughly mixed in a pan mill and was then passed through the same pelletizing machine with dies to make the same egg-shaped pellets about 1.5 inches long as in Example I. The container 51 was then charged with pellets 55 and the tube 50 was loaded as described in connection with Example I and as shown in Figure 1.

The container 51 was then heated to 1600° C. and held at this temperature for two hours. As the result of this run there were produced pellets of silicon carbide having a silicon carbide content of 91.45%, free carbon of 3.18%, the remainder mostly silica with some ash. This material had substantially the same physical properties as the material of Example I and was an excellent grade of metallurgical silicon carbide.

EXAMPLE III

I provided the following mixture.

Table III

| | Parts by weight |
|---|---|
| Silica sand through 160 mesh | 56.5. |
| Petroleum coke 100 grit size | 34 fixed carbon. |
| Sodium silicate solution, $10Na_2O30SiO_260H_2O$ | 18. |
| Calcium hydrogen phosphate, $CaHPO_4$ | 2. |

Proceeding to make pellets as in Examples I and II, I charged the container 51 and loaded the tube 50 as in those examples and heated the charge to 1550° C. maintained for four hours. The material thereby made was 88.08% SiC, 3.41% free carbon, remainder silica with some ash and the same physical characteristics. This was good metallurgical silicon carbide of high purity.

EXAMPLE IV

I provided the following mixture.

Table IV

| | Parts by weight |
|---|---|
| Silica sand through 160 mesh | 56.5. |
| Petroleum coke 100 grit size | 34 fixed carbon. |
| Sodium silicate solution, $10Na_2O30SiO_260H_2O$ | 18. |
| Iron phosphate, $FePO_4$ | 1. |

Proceeding to make pellets as in the preceding examples, I charged the container 51 and loaded the tube 50 as heretofore described and heated the charge to 1550° C. maintained for four hours. The material thereby made was 81.21% SiC, 4.33% free carbon, remainder silica with some ash and the same physical characteristics. This was good metallurgical silicon carbide.

EXAMPLE V

I provided the following mixture.

Table V

| | Parts by weight |
|---|---|
| Silica sand through 160 mesh | 56 |
| Metallurgical coke 100 grit size | 33 |
| Sodium silicate solution $10Na_2O30SiO_260H_2O$ | 11 |

Proceeding to make pellets as in the preceding examples, I charged the container 51 and loaded the tube 50 as in those examples and heated the charge to 1600° C. maintained for two hours. The material thereby made was 80.21% SiC, 6.35% free carbon, remainder chiefly silica with some ash and the same physical characteristics. This was good metallurgical silicon carbide.

The melting point of silica is usually given as 1610° C. It will be noticed that in all of the examples the temperature was below this figure. This is advantageous as I have found by additional work at higher temperatures that as the silica is melted the reaction charge plugs up the apparatus more readily. The process of my invention can be used in continuous feeding annd heating apparatus and will not plug it up.

Pelletizing also increases the reaction below the melting point of silica. Therefore, in the preferred manner of putting my invention into practice the mixture is pelletized. This can be defined as forming pellets out of a mass of mixed particles and the size of the pellets is not critical. They can be large or small provided that bonded aggregates of mixture are formed.

The use of phosphates also accelerates the dissociation of the silica to cause the reaction to go more nearly to completion in a given time at a given temperature. One percent of phosphate is a significant amount and I would not use more than 5% thereof. Several phosphates have been mentioned but almost any phosphate can be used.

In the tables the amount of coke is given as so much fixed carbon. This means that there are so many parts of the fixed carbon content of the coke in the total coke used. Naturally the percentage of fixed carbon of the coke is first determined. While examples of petroleum coke are given, metallurgical coke and pitch coke can also be used. The silica sand should be finely divided, preferably through 100 mesh or finer. Very fine particles of silica are not detrimental except that they are dusty.

In the practice of this invention the minimum heating time at the temperatures specified, viz below the melting point of silica, is one hour. The material produced hereby, after having been heated at below the melting point of silica for at least one hour, but preferably for two hours, can be heated at higher temperatures in the same or different apparatus to transform part or all of it to silicon carbide of hexagonal crystal structure.

It will thus be seen that there has been provided by this invention a process of synthesizing silicon carbide in which the various objects hereinabove set forth together with many practical advantages are successfully achieved. As various possible embodiments might be made of the mechanical features of the above invention and as the art herein described might be varied in various parts, all without departing from the scope of the invention, it is to be understood that all matter hereinbefore set forth or shown in the accompanying drawings is to be interpreted as illustrative and not in a limiting sense.

I claim:

1. Process of synthesizing silicon carbide which comprises heating in a container a mixture of silica and coke both in solid phase to a reaction temperature which is below the melting point of silica for at least one hour, and never rises to the melting point of silica, thereby causing some carbon of the coke to remove the oxygen of the silica and thereby causing the resulting silicon to combine with more carbon of the coke to form silicon carbide of cubic crystallinity in a solid phase reaction.

2. Process according to claim 1 in which the mixture is first pelletized.

3. Process according to claim 2 in which the mixture is heated for at least two hours.

4. Process according to claim 3 in which a phosphate is added to the mixture.

5. Process according to claim 1 in which the mixture is heated for at least two hours.

6. Process according to claim 5 in which a phosphate is added to the mixture.

7. Process according to claim 1 in which a phosphate is added to the mixture.

8. Process according to claim 7 in which the mixture is first pelletized.

References Cited in the file of this patent

UNITED STATES PATENTS

| | | |
|---|---|---|
| 1,488,311 | Brockbank | Mar. 25, 1924 |
| 1,925,396 | Masin | Sept. 5, 1933 |
| 2,178,773 | Benner | Nov. 7, 1939 |
| 2,431,327 | Geiger | Nov. 25, 1947 |
| 2,729,542 | Van Der Pyl | Jan. 3, 1956 |

OTHER REFERENCES

Mellor: "Comprehensive Treatise on Inorganic and Theoretical Chemistry," volume 5, page 876.